(12) United States Patent (10) Patent No.: US 8,736,675 B1
Holzbach et al. (45) Date of Patent: May 27, 2014

(54) MULTI-CORE PROCESSOR ARCHITECTURE FOR ACTIVE AUTOSTEREOSCOPIC EMISSIVE DISPLAYS

(75) Inventors: Mark E. Holzbach, Austin, TX (US); Mark E. Lucente, Austin, TX (US); Thomas L. Burnett, III, Austin, TX (US)

(73) Assignee: Zebra Imaging, Inc., Austin, TX (US)

( * ) Notice: Subject to any disclaimer, the term of this patent is extended or adjusted under 35 U.S.C. 154(b) by 1237 days.

(21) Appl. No.: 11/949,763

(22) Filed: Dec. 3, 2007

Related U.S. Application Data (60) Provisional application No. 60/872,397, filed on Dec. 1, 2006.

(51) Int. Cl.
*H04N 13/04* (2006.01)
*H04N 5/89* (2006.01)
*H04N 13/00* (2006.01)
*G03H 1/04* (2006.01)
*G03H 1/26* (2006.01)
*G03H 1/02* (2006.01)
*G02B 27/22* (2006.01)

(52) U.S. Cl.
USPC ............... 348/59; 348/40; 348/41; 348/42; 359/35; 359/23; 359/27; 359/28; 359/463

(58) Field of Classification Search
USPC ............ 348/40–42, 59; 359/23, 462–463, 35, 359/27–28; 382/234
See application file for complete search history.

(56) References Cited

U.S. PATENT DOCUMENTS

| | | | |
|---|---|---|---|
| 5,465,175 A * | 11/1995 | Woodgate et al. | 359/463 |
| 5,808,792 A * | 9/1998 | Woodgate et al. | 359/463 |
| 6,330,088 B1 | 12/2001 | Klug et al. | 359/23 |
| 6,366,370 B1 | 4/2002 | Holzbach et al. | 359/23 |
| 6,549,308 B1 | 4/2003 | Camahort | 359/9 |
| 6,721,101 B2 | 4/2004 | Daniell | 359/626 |
| 6,868,177 B1 * | 3/2005 | Camahort et al. | 382/154 |
| 7,084,841 B2 * | 8/2006 | Balogh | 345/87 |
| 7,190,496 B2 * | 3/2007 | Klug et al. | 359/23 |
| 7,259,898 B2 * | 8/2007 | Khazova et al. | 359/15 |
| 7,554,737 B2 * | 6/2009 | Knox et al. | 359/599 |
| 7,864,419 B2 * | 1/2011 | Cossairt et al. | 359/446 |

(Continued)

OTHER PUBLICATIONS

Jesse B. Eichenlaub et al, "Prototype flat panel hologram-like display that produces multiple perspective views at full resolution", (Mar. 30, 1995), SPIE 2409, Stereoscopic Displays and Virtual Reality Systems II, p. 102-112.*

(Continued)

*Primary Examiner* — Gregory Todd
(74) *Attorney, Agent, or Firm* — Chowdhury & Georgakis, P.C.

(57) ABSTRACT

In one implementation, a system includes a multi-core processor and an optical display with a plurality of hogels. Each hogel is configured to radiate light in a plurality of directions, with controllable intensities in each of the plurality of directions. The multi-core processor is coupled to the optical display and configured to control the hogels. The multi-core processor includes at least two cores, an on-chip memory, and a master processor in a single integrated circuit package. The master processor may be a general-purpose on-chip processor, such as a core in the multi-core processor, that is used to coordinated operations of the other cores. Each of the cores is configured to receive hogel data and to generate signals for a corresponding subset of the plurality of hogels.

22 Claims, 5 Drawing Sheets

(56) References Cited

U.S. PATENT DOCUMENTS

| | | | |
|---|---|---|---|
| 2003/0086136 A1* | 5/2003 | Orr et al. | 359/23 |
| 2004/0042161 A1* | 3/2004 | Cameron et al. | 361/681 |
| 2005/0146787 A1* | 7/2005 | Lukyanitsa | 359/462 |
| 2008/0144174 A1* | 6/2008 | Lucente et al. | 359/463 |

OTHER PUBLICATIONS

Michael W. Halle, "The Generalized Holographic Stereogram," Master's thesis, MIT (available at http://hdl.handle.net/1721.1/13762), 124 pages (1991).

M. Levoy and P. Hanrahan, "Light Field Rendering," in Computer Graphics Proceedings, Annual Conference Series (ACM SIGGRAPH'96, New Orleans, La., Aug. 4-9, 1996), pp. 31-42 (1996).

M. Halle and A. Kropp, "Fast computer graphics rendering for full parallax spatial displays," Proc. SPIE vol. 3011, p. 105-112, *Practical Holography XI and Holographic Materials III* (Apr. 1997).

Michael W. Halle, "Multiple Viewpoint Rendering for Three-Dimensional Displays," Ph.D. thesis, MIT (available at http://hdl.handle.net/1721.1/29127), 164 pages (1997).

Pham et al., "The Design and Implementation of a First-Generation Cell Processor," IEEE International Solid-State Circuits Conference, pp. 184-185, 592 (2005).

Kahle et al., "Introduction to the Cell multiprocessor," IBM J. Res. & Dev., vol. 49, No. 4/5, pp. 589-604 (Jul./Sep. 2005).

John Markoff, "Faster Chips are Leaving Programmers in Their Dust," *New York Times*, (downloaded Dec. 18, 2007 from http://www.nytimes.com/2007/12/17/technology/17chip.html) Dec. 17, 2007, 4 pages.

\* cited by examiner

MULTI-CORE PROCESSOR ARCHITECTURE FOR ACTIVE AUTOSTEREOSCOPIC EMISSIVE DISPLAYS

This application claims the benefit, under 35 U.S.C. §119 (e), of U.S. Provisional Application No. 60/872,397, entitled "Multi-core processor architecture for active autostereoscopic emissive displays," filed Dec. 1, 2006, and naming Mark Holzbach, et. al, as inventors, which is hereby incorporated by reference herein in its entirety.

The U.S. Government has a paid-up license in this invention and the right in limited circumstances to require the patent owner to license others on reasonable terms as provided for by the terms of contract No. NBCHC050098 awarded by DARPA.

BACKGROUND

1. Field of the Invention

The present application related in general to the display of three-dimensional images, and more particularly, to tools and techniques for using multi-core processor architectures with active or dynamic autostereoscopic displays.

2. Description of the Related Art

The processing of information to display a three-dimensional image generally requires substantial mounts of computational effort. A graphical display can be termed autostereoscopic when the work of stereo separation is done by the display so that the observer need not wear special eyewear. A number of displays have been developed to present a different image to each eye, so long as the observer remains fixed at a location in space. Most of these are variations on the parallax barrier method, in which a fine vertical grating or lenticular lens array is placed in front of a display screen. If the observer's eyes remain at a fixed location in space, one eye can see only a certain set of pixels through the grating or lens array, while the other eye sees only the remaining set.

Examples of techniques for producing holograms can be found in U.S. Pat. No. 6,330,088, entitled "Method and apparatus for recording one-step, full-color, full-parallax, holographic stereograms" and naming Michael A. Klug et al. as inventors, (the "'088 patent") which is hereby incorporated by reference herein in its entirety. As the goals and complexity of three-dimensional displays grow, it would be helpful to have tools that support the computational needs of these systems.

SUMMARY

In one implementation, a system includes a multi-core processor and an optical display with a plurality of hogels. Each hogel is configured to radiate light in a plurality of directions, with controllable intensities in each of the plurality of directions. The multi-core processor is coupled to the optical display and configured to control the hogels. The multi-core processor includes at least two cores, an on-chip memory, and a master processor in a single integrated circuit package. The master processor may be a general-purpose on-chip processor, for example, one of the cores in the multi-core processor, that is used to coordinated operations of the other cores. Each of the cores is configured to receive hogel data for a model of a three-dimensional object (which may be a model of an existing object or of a computer-generated object), and to generate signals based on the model for a corresponding subset of the plurality of hogels.

BRIEF DESCRIPTION OF THE DRAWINGS

The subject matter of the present application may be better understood, and the numerous objects, features, and advantages made apparent to those skilled in the art, by referencing the accompanying drawings.

DETAILED DESCRIPTION

Full-parallax three-dimensional emissive electronic displays (and alternately horizontal-parallax-only displays, or transmissive or reflective displays) are formed by combining high resolution two-dimensional emissive image sources with appropriate optics. One or more computer processing units may be used to provide computer graphics image data to the high resolution two-dimensional image sources. In general, numerous different types of emissive displays can be used. Emissive displays generally refer to a broad category of display technologies which generate their own light, including: electroluminescent displays, field emission displays, plasma displays, vacuum fluorescent displays, carbon-nanotube displays, and polymeric displays. In contrast, non-emissive displays require a separate, external source of light (such as the backlight of a liquid crystal display).

The hogels (variously "active" or "dynamic" hogels) described in the present application are not like one-step hologram hogels in that they are not fringe patterns recorded in a holographic recording material. Instead, the active hogels of the present application display suitably processed images (or portions of images) such that when they are combined they present a composite autostereoscopic image to a viewer. Consequently, various techniques disclosed in the '088 patent for generating hogel data are applicable to the present application. Other hogel data and computer graphics rendering techniques can be used with the systems and methods of the present application, including image-based rendering techniques. The application of those rendering techniques to the field of holography and autostereoscopic displays is described, for example, in U.S. Pat. No. 6,868,177, entitled "Efficient block transform including pre-processing and post processing for autostereoscopic displays" and naming Emilio Camahort et al. as inventors (the "'177 patent"), which is hereby incorporated by reference herein in its entirety. Numerous other techniques for generating the source images will be well known to those skilled in the art.

One of the main characteristics of many embodiments of active autostereoscopic displays is the use of multiple emissive display elements together. In general, each element displays a single hogel, or portion(s) thereof, so that together the array of emissive displays can act as a single active autostereoscopic display. Consequently, multiple separate hogel images must be rendered and displayed at an appropriate time. This can be performed using one or more dedicated processors for each element. However, to improve efficiency of operation, compactness of design, and cost, the inventors have discovered techniques for rendering hogel images and synchronizing their delivery to respective display elements using multiprocessing architectures. In particular, a variety of multi-core processing architectures can be used. Such architectures can be adapted into the design of central processing units (CPUs), graphical processing units (GPUs), and combinations thereof. Various examples of active autostereoscopic displays are described below.

A multi-core processor combines two or more independent processors (or processing cores) into a single package, and typically into a single integrated circuit. Multi-core architectures generally allow a computing device to use some form of thread-level parallelism without including multiple microprocessors in separate physical packages. The cores are generally coordinated by a single on-chip general-purpose master processor. Multi-core architectures can offer a variety of advantages. These devices are typically smaller than equivalent symmetric multiprocessing alternatives, thereby reducing printed circuit board space, power consumption, etc. Further power savings can be achieved because less power is needed to drive signals external to the integrated circuit and because smaller process geometry typically allow the cores to operate at lower voltages. Multi-core architectures often share some circuitry, such as L2 cache and bus interface circuitry. In still other examples, the physical proximity of the cores allows various circuits, such as cache coherency circuitry, to operate at very high clock rates.

Examples of specific multi-core architectures include: POWER4 and POWER5 multi-core PowerPC processors (IBM); UltraSPARC IV, IV+, and T1 (CoolThreads or "Niagara") processors (Sun Microsystems); numerous multi-core processors from AMD and Intel, and the Cell processor (IBM). While the devices and techniques disclosed in this application can generally be implemented using a variety of different multi-core processors, certain examples will emphasize the Cell processor architecture.

The Cell processor is described in greater detail in various documents including, Pham et al., "The Design and Implementation of a First-Generation CELL Processor," 2005 IEEE International Solid-State Circuits Conference, pp. 184-185; and Kahle et al., "Introduction to the Cell Multiprocessor," IBM J. Res. & Dev. Vol. 49, No. 4/5 July/September 2005; both of which are incorporated by reference herein. The Cell architecture extends the 64-bit Power architecture with cooperative offload processors ("synergistic processors"), with the direct memory access (DMA) and synchronization mechanisms to communicate with them ("memory flow control"), and with enhancements for real-time management. The first-generation Cell processor combines a dual-threaded, dual-issue, 64-bit Power-Architecture compliant power processor element (PPE) with eight synergistic processor elements (SPEs), an on-chip memory controller, and a controller for a configurable I/O interface. These units are interconnected with a coherent on-chip element interconnect bus (EIB). Extensive support for pervasive functions such as power-on, test, on-chip hardware debug, and performance-monitoring functions is also included. Some important aspects of the architecture include: high design frequency (small number of gates per cycle), allowing the processor to operate at a low voltage and low power while maintaining high frequency and high performance; Power Architecture compatibility; single-instruction, multiple-data (SIMD) architecture, supported by both vector media extensions on the PPE and the instruction set of the SPEs, as one of the means to improve game/media and scientific performance at improved power efficiency; power and area efficient design supporting the high design frequency; SPEs for coherent offload (SPEs have local memory, asynchronous coherent DMA, and a large unified register file to improve memory bandwidth and to provide improved power efficiency and performance); dynamic configurability of SPEs; and high-bandwidth flexible I/O configurable to support a number of system organizations.

The Cell architecture may be used to illustrate some examples of how multi-core processors can be used for hogel rendering. For example, the Cell's SPEs can be dedicated to rendering, compositing, and/or synchronizing multiple hogel data streams. In the first generation Cell processor, there are eight SPEs. All eight can be used to render hogels (or portions thereof) for respective display elements or some combination thereof. Similarly, SPEs can be paired up, one for hogel rendering, and one for support (e.g., synchronization, display control, compositing, etc.) Various other uses of the PPE and SPEs can be implemented. Moreover, the types of graphics rendering performed for hogel generation are particularly suited to providing multiple independent data parallel tasks that optimize well in a SIMD processing environment. Cell processors or other advanced multi-core processors can also be used to extend more sophisticated rendering techniques such as ray tracing and image-based rendering (e.g., "light field" rendering), to real-time or near-real-time operation. This is very advantageous for active autostereoscopic emissive displays.

Multi-core processors like the Cell processor are typically designed to improve memory bandwidth by implementing high-speed memory (e.g., Rambus XDR DRAM) and sophisticated memory communication fabrics. High bandwidth memory enables enough on-chip interaction bandwidth between processor elements to allow multi-hogel rendering and inter-frame multi-hogel data stream synchronization. It also enables the kind of performance appropriate for real-time compositing of multiple hogel data streams. For example, one SPE might perform an image-based rendering of a terrain database, while another might perform a scan-line rendering of annotation information for the same hogel view. The inter-SPE memory bandwidth allows one of the SPEs (perhaps a third SPE) to overlay and composite the two source data streams together in real time, synchronized with other hogel data streams, either from other SPEs on the same Cell processor or perhaps on other Cell processors. In still other examples, two or more hogel data streams can be composited allowing for even more sophisticated types of information access and real-time manipulation. For example, multiple data streams can be interactively toggled on and off, presenting different information "layers." Other examples include multilayer data registration workflows where different layers representing various mission operation scenarios that fit over a single base terrain. Many other ways of interacting with such multiple layers can be implemented.

As noted above, SPEs also have local memory, asynchronous coherent DMA, and a large unified register file, all of which help optimize memory bandwidth. Nearby hogel data streams are typically very similar (e.g., they have a high degree of image coherence), and so unconventional rendering techniques that exploit coherence such as those described in Michael Halle's Ph.D thesis "Multiple Viewpoint Rendering for Three-Dimensional Displays" (MIT 1997) would be enabled. Furthermore, techniques for hogel data stream interpolation are also enabled by this memory architecture. In still other examples, local SPE memory can store hogel or display element calibration data that is periodically updated for proper display operation. Similarly, one or more SPEs could also be completely dedicated to real-time calibration of a display element or larger segments of the display system. In general, the nature of the emissive display elements and the various types of desired rendering can benefit from the use of multi-core processors. In still other embodiments, the multi-core processor techniques of the present application can be extended to use with other types of autostereoscopic displays, such as those described in the aforementioned '088 patent.

Various examples of active autostereoscopic displays are described below. Further information regarding autostereoscopic displays may be found, for example, in U.S. patent Ser. No. 11/834,005, entitled "Dynamic autostereoscopic displays," filed Aug. 5, 2007, and naming Mark E. Lucente et al. as inventors (the "'005 application"), which is hereby incorporated by reference herein in its entirety.

Figure 1:
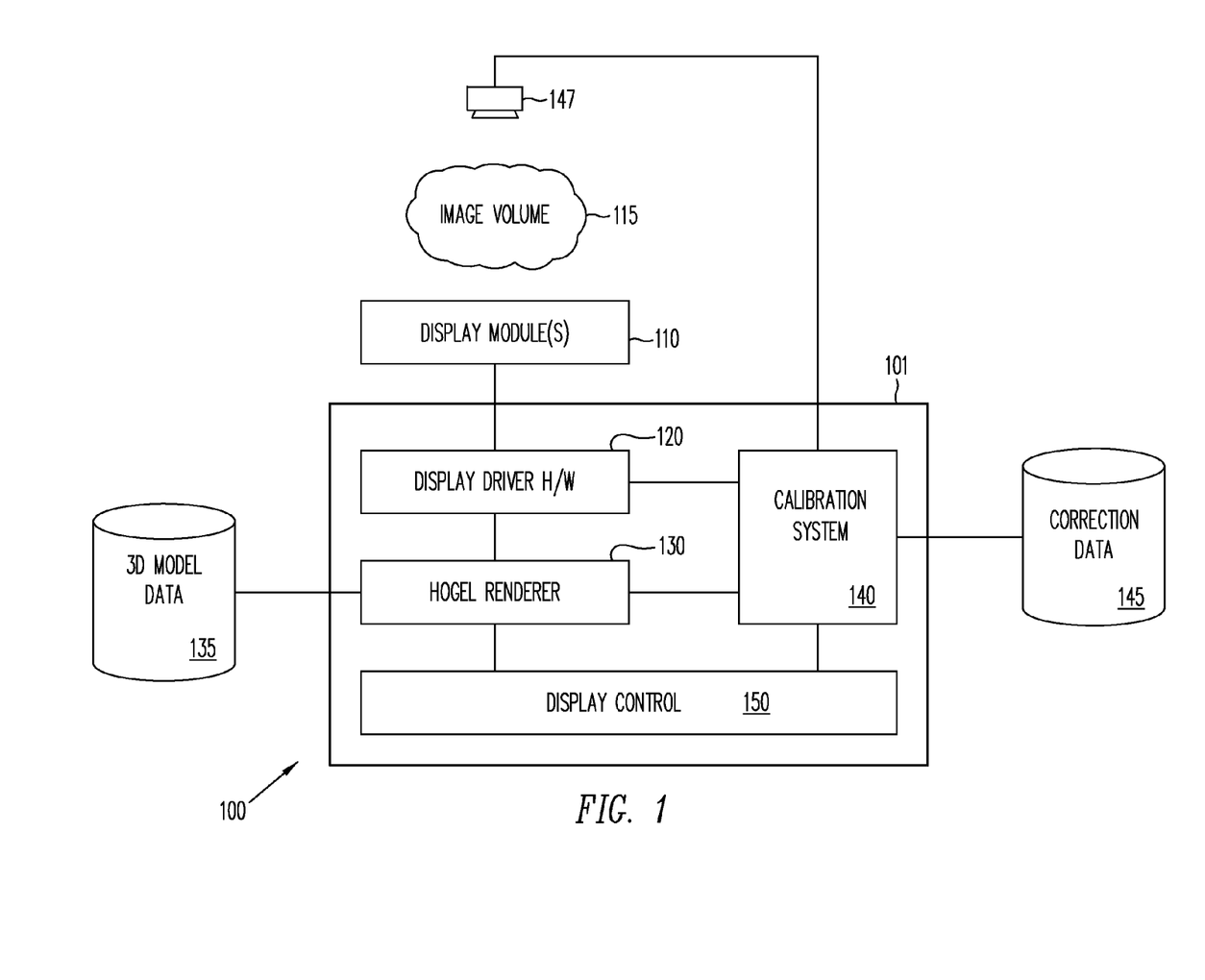
FIG. 1 is a block diagram of a dynamic display system for three-dimensional images using a multi-core processor.

FIG. 1 illustrates a block diagram of an example of a dynamic autostereoscopic display system 100. Various system components are described in greater detail below, and numerous variations on this system design (including additional elements, excluding certain illustrated elements, etc.) are contemplated. System 100 includes one or more dynamic autostereoscopic display modules 110 producing dynamic autostereoscopic images illustrated by display volume 115. In this sense, an image can be a two-dimensional or three-dimensional image. These modules use emissive light modulators or displays to present hogel images to users of the device. In general, numerous different types of emissive or non-emissive displays can be used. Emissive displays generally refer to a broad category of display technologies which generate their own light, including: electroluminescent displays, field emission displays, plasma displays, vacuum fluorescent displays, carbon-nanotube displays, and polymeric displays such as organic light emitting diode (OLED) displays. In contrast, non-emissive displays require external source of light (such as the backlight of a liquid crystal display). Dynamic autostereoscopic display modules 110 typically include other optical and structural components described in greater detail below. In addition to emissive modulators (SLMs), a number of other types of modulation devices can be used. In various implementations, non-emissive modulators may be less compact than competing emissive modulators. For example, SLMs may be made using the following technologies: electro-optic (e.g., liquid-crystal) transmissive displays; micro-electro-mechanical (e.g., micromirror devices, including the TI DLP) displays; electro-optic reflective (e.g., liquid crystal on silicon, (LCoS)) displays; magneto-optic displays; acousto-optic displays; and optically addressed devices.

Various data-processing and signal-processing components are used to create the input signals used by display modules 110. In various implementations, these components can be considered as a computational block 101 that obtains data from sources, such as data repositories or live-action inputs for example, and provides signals to display modules 110. One or more multicore processors may be used in series or in parallel, or combinations thereof, in conjunction with other computational hardware to implement operations that are performed by computational block 101. Computational block 101 can include, for example, one or more display drivers 120, a hogel renderer 130, a calibration system 140, and a display control 150.

Each of the emissive display devices employed in dynamic autostereoscopic display modules 110 is driven by one or more display drivers 120. Display driver hardware 120 can include specialized graphics processing hardware such as a graphics processing unit (GPU), frame buffers, high speed memory, and hardware provide requisite signals (e.g., VESA-compliant analog RGB, signals, NTSC signals, PAL signals, and other display signal formats) to the emissive display. Display driver hardware 120 provides suitably rapid display refresh, thereby allowing the overall display to be dynamic. Display driver hardware 120 may execute various types of software, including specialized display drivers, as appropriate.

Hogel renderer 130 generates hogels for display on display module 110 using data for a three-dimensional model 135. In one implementation, 3D image data 135 includes virtual reality peripheral network (VRPN) data, which employs some device independence and network transparency for interfacing with peripheral devices in a display environment. In addition, or instead, 3D image data 135 can use live-capture data, or distributed data capture, such as from a number of detectors carried by a platoon of observers. Depending on the complexity of the source data, the particular display modules, the desired level of dynamic display, and the level of interaction with the display, various different hogel rendering techniques can be used. Hogels can be rendered in real-time (or near-real-time), pre-rendered for later display, or some combination of the two. For example, certain display modules in the overall system or portions of the overall display volume can utilize real-time hogel rendering (providing maximum display updateability), while other display modules or portions of the image volume use pre-rendered hogels.

Distortion associated with the generation of hogels for horizontal-parallax-only (HPO) holographic stereograms is analyzed in Michael W. Halle, "The Generalized Holographic Stereogram," Master's Thesis, Massachusetts Institute of Technology, February 1991, which is hereby incorporated by reference herein in its entirety. In general, for HPO holographic stereograms (and other HPO autostereoscopic displays), the best viewer location where a viewer can see an undistorted image is at the plane where the camera (or the camera model in the case of computer graphics images) captured the scene. This is an undesirable constraint on the viewability of autostereoscopic displays. Using several different techniques, one can compensate for the distortion introduced when the viewer is not at the same depth with respect to the autostereoscopic displays as the camera. An anamorphic physical camera can be created with a standard spherical-surfaced lens coupled with a cylindrical lens, or alternately two crossed cylindrical lenses can be used. Using these optics, one can independently adjust horizontal and vertical detail in the stereogram images, thereby avoiding distortion. Since the dynamic displays of the present application typically use computer graphics data (either generated from 3D models or captured using various known techniques) computer graphics techniques are used instead of physical optics.

For a computer graphics camera, horizontal and vertical independence means that perspective calculations can be altered in one direction without affecting the other. Moreover, since the source of the image models used for producing autostereoscopic images is typically rendered computer graphics images (or captured digital image data), correcting the distortion as part of the image generation process is a common technique. For example, if the computer graphics images being rendered can be rendered as if seen through the aforementioned physical optics (e.g., using ray tracing where the computer graphics model includes the optics between the scene and the computer graphics camera), then hogel images that account for distortion can be directly rendered. Where ray tracing is impractical (e.g., because of rendering speed or dataset size constraints) another technique for rendering hogel images can be used to "pre-distort" hogel images. This technique is described in M. Halle and A Kropp, "Fast Computer Graphics Rendering for Full Parallax Spatial Displays," Practical Holography XI, Proc. SPIE, vol. 3011, pages 105-

112, Feb. 10-11, 1997, which is hereby incorporated by reference herein in its entirety. While useful for their speed, the techniques of Halle and Kropp often introduce additional (and undesirable) rendering artifacts and are susceptible to problems associated with anti-aliasing. Improvements upon the techniques of Halle and Kropp are discussed in the U.S. patent application Ser. No. 09/474,361, entitled "Rendering methods for full parallax autostereoscopic displays," filed on Dec. 29, 1999, and naming Mark E. Holzbach and David Chen as inventors, which is hereby incorporated by reference herein in its entirety.

Still another technique for rendering hogel images utilizes a computer graphics camera whose horizontal perspective (in the case of horizontal-parallax-only (HPO) and full parallax holographic stereograms) and vertical perspective (in the case for fill parallax holographic stereograms) are positioned at infinity. Consequently, the images rendered are parallel oblique projections of the computer graphics scene, e.g., each image is formed from one set of parallel rays that correspond to one "direction." If such images are rendered for each of (or more than) the directions that a hologram printer is capable of printing, then the complete set of images includes all of the image data necessary to assemble all of the hogels. This last technique is particularly useful for creating holographic stereograms from images created by a computer graphics rendering system utilizing imaged-based rendering. Image-based rendering systems typically generate different views of an environment from a set of pre-acquired imagery.

The development of image-based rendering techniques generally, and the application of those techniques to the field of holography have inspired the development of light field rendering as described by, for example, M. Levoy and P. Hanrahan in "Light Field Rendering," in Proceedings of SIG-GRAPH'96, (New Orleans, La., Aug. 4-9, 1996), and in Computer Graphics Proceedings, Annual Conference Series, pages 31-42, ACM SIGGRAPH, 1996, which are hereby incorporated by reference herein in their entirety. The light field represents the amount of light passing through all points in 3D space along all possible directions. It can be represented by a high-dimensional function giving radiance as a function of time, wavelength, position and direction. The light field is relevant to image-based models because images are two-dimensions projections of the light field. Images can then be viewed as "slices" cut through the light field. Additionally, one can construct higher-dimensional computer-base models of the light field using images. A given model can also be used to extract and synthesize new images different from those used to build the model.

Formally, the light field represents the radiance flowing through all the points in a scene in all possible directions. For a given wavelength, one can represent a static light field as a five-dimensional (5D) scalar function $L(x, y, z, \theta, \phi)$ that gives radiance as a function of location $(x, y, z)$ in 3D space and the direction $(\theta, \phi)$ the light is traveling. Note that this definition is equivalent to the definition of plenoptic function. Typical discrete (e.g., those implemented in real computer systems) light-field models represent radiance as a red, green and blue triple, and consider static time-independent light-field data only, thus reducing the dimensionality of the light-field function to five dimensions and three color components. Modeling the light-field thus requires processing and storing a 5D function whose support is the set of all rays in 3D Cartesian space. However, light field models in computer graphics usually restrict the support of the light-field function to four dimensional (4D) oriented line space. Two types of 4D light-field representations have been proposed, those based on planar parameterizations and those based on spherical, or isotropic, parameterizations.

As discussed in U.S. Pat. No. 6,549,308, entitled "Unibiased light field models for rendering and holography" and naming Emilio Camahort as inventor (the "'308 patent"), which is hereby incorporated by reference herein in its entirety, isotropic parameterizations are particularly useful for applications in computer generated holography. Isotropic models, and particularly direction-and-point parameterizations (DPP) introduce less sampling bias than planar parameterizations, thereby leading to a greater uniformity of sample densities. In general, DPP representations are advantageous because they require fewer correction factors than other representations, and thus their parameterization introduces fewer biases in the rendering process. Various light field rendering techniques suitable for the dynamic autostereoscopic displays of the present application are further described in the aforementioned '308 and '177 patents.

A massively parallel active hogel display can be a challenging display from an interactive computer graphics rendering perspective. Although a lightweight dataset (e.g., geometry ranging from one to several thousand polygons) can be manipulated and multiple hogel views rendered at real-time rates (e.g., 10 frames per second (fps) or above) on a single GPU graphics card, many datasets of interest are more complex. Urban terrain maps are one example. Consequently, various techniques can be used to composite images for hogel display so that the time-varying elements are rapidly rendered (e.g., vehicles or personnel moving in the urban terrain), while static features (e.g., buildings, streets, etc.) are rendered in advance and re-used. It is contemplated that the time-varying elements can be independently rendered, with considerations made for the efficient refreshing of a scene by re-rendering only the necessary elements in the scene as those elements move. Thus, the aforementioned lightfield rendering techniques can be combined with more conventional polygonal data model rendering techniques such as scanline rendering and rasterization. Still other techniques such as ray casting and ray tracing can be used.

Thus, hogel renderer 130 and 3D image data 135 can include various different types of hardware (e.g., graphics cards, GPUs, graphics workstations, rendering clusters, dedicated ray tracers, etc.), software, and image data as will be understood by those skilled in the art. Moreover, some or all of the hardware and software of hogel renderer 130 can be integrated with display driver 120 as desired.

System 100 also includes elements for calibrating the dynamic autostereoscopic display modules, including calibration system 140 (typically comprising a computer system executing one or more calibration algorithms), correction data 145 (typically derived from the calibration system operation using one or more test patterns) and one or more detectors 147 used to determine actual images, light intensities, etc. produced by display modules 110 during the calibration process. The resulting information can be used by one or more of display driver hardware 120, hogel renderer 130, and display control 150 to adjust the images displayed by display modules 110.

An ideal implementation of display module 110 provides a perfectly regular array of active hogels, each comprising perfectly spaced, ideal lenslets fed with perfectly aligned arrays of hogel data from respective emissive display devices. In reality however, non-uniformities (including distortions) exist in most optical components, and perfect alignment is rarely achievable without great expense. Consequently, system 100 will typically include a manual, semi-automated, or automated calibration process to give the display the ability to correct for various imperfections (e.g., component alignment, optic component quality, variations in emissive display performance, etc.) using software executing in calibration system 140. For example, in an auto-calibration "booting" process, the display system (using external sensor 147) detects misalignments and populates a correction table with correction factors deduced from geometric considerations. Once calibrated, the hogel-data generation algorithm utilizes a correction table in real-time to generate hogel data pre-adapted to imperfections in display modules 110.

Finally, display system 100 typically includes display control software and/or hardware 150. This control can provide users with overall system control including sub-system control as necessary. For example, display control 150 can be used to select, load, and interact with dynamic autostereoscopic images displayed using display modules 110. Control 150 can similarly be used to initiate calibration, change calibration parameters, re-calibrate, etc. Control 150 can also be used to adjust basic display parameters including brightness, color, refresh rate, and the like. As with many of the elements illustrated in FIG. 1, display control 150 can be integrated with other system elements, or operate as a separate subsystem. Numerous variations will be apparent to those skilled in the art. Various calibration details are discussed in greater detail below.

Figure 2:
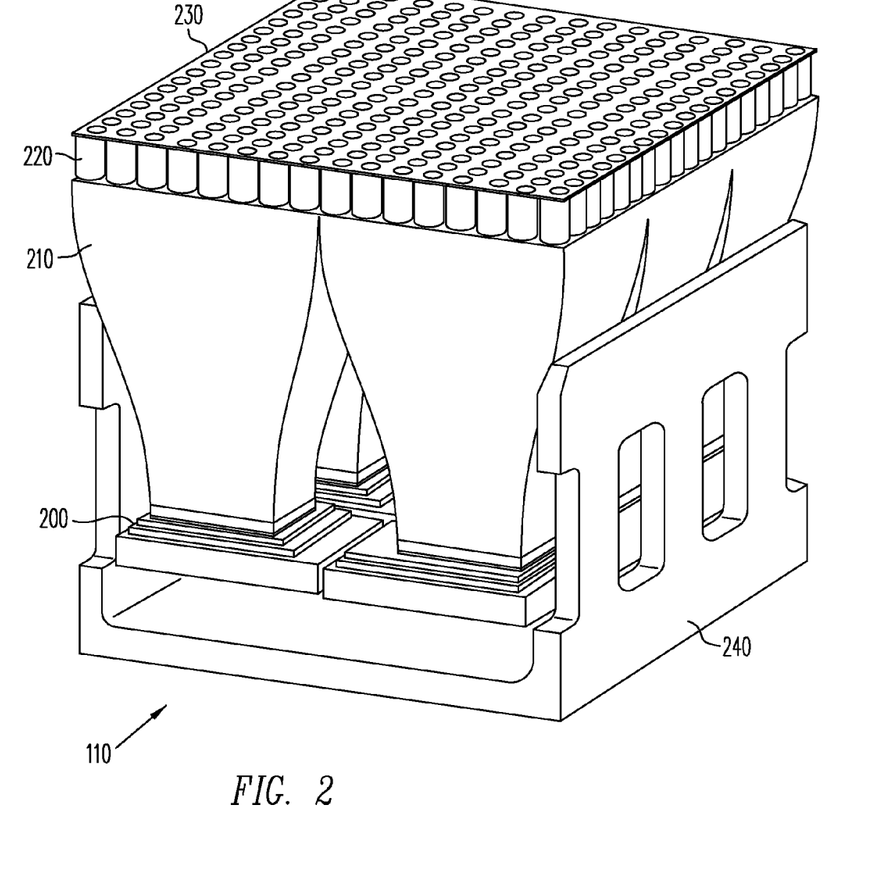
FIG. 2 illustrates an example of a dynamic autostereoscopic display module.

FIG. 2 illustrates an example of a dynamic autostereoscopic display module. Dynamic autostereoscopic display module 110 illustrates the arrangement of optical, electro-optical, and mechanical components in a single module. These basic components include: emissive display 200 which acts as a light source and spatial light modulator, fiber taper 210 (light delivery system), lenslet array 220, aperture mask 230 (e.g., an array of circular apertures designed to block scattered stray light), and support frame 240. Omitted from the figure for simplicity of illustration are various other components including cabling to the emissive displays, display driver hardware, external support structure for securing multiple modules, and various diffusion devices.

Module 110 includes six OLED microdisplays arranged in close proximity to each other. Modules can variously include fewer or more microdisplays. Relative spacing of microdisplays in a particular module (or from one module to the next) largely depends on the size of the microdisplay, including, for example, the printed circuit board and/or device package on which it is fabricated. For example, the drive electronics of displays 200 reside on a small stacked printed-circuit board, which is sufficiently compact to fit in the limited space beneath fiber taper 210. As illustrated, emissive displays 200 cannot be have their display edges located immediately adjacent to each other, e.g., because of device packaging. Consequently, light delivery systems or light pipes such as fiber taper 210 are used to gather images from multiple displays 200 and present them as a single seamless (or relatively seamless) image. In still other embodiments, image delivery systems including one or more lenses, e.g., projector optics, mirrors, etc., can be used to deliver images produced by the emissive displays to other portions of the display module.

The light-emitting surface ("active area") of emissive displays 200 is covered with a thin fiber faceplate, which efficiently delivers light from the emissive material to the surface with only slight blurring and little scattering. During module assembly, the small end of fiber taper 210 is typically optically index-matched and cemented to the faceplate of the emissive displays 200. In some implementations, separately addressable emissive display devices can be fabricated or combined in adequate proximity to each other to eliminate the need for a fiber taper fiber bundle, or other light pipe structure. In such embodiments, lenslet array 220 can be located in close proximity to or directly attached to the emissive display devices. The fiber taper also provides a mechanical spine, holding together the optical and electro-optical components of the module. In many embodiments, index matching techniques (e.g., the use of index matching fluids, adhesives, etc.) are used to couple emissive displays to suitable light pipes and/or lenslet arrays. Fiber tapers 210 often magnify (e.g., 2:1) the hogel data array emitted by emissive displays 200 and deliver it as a light field to lenslet array 220. Finally, light emitted by the lenslet array passes through black aperture mask 230 to block scattered stray light.

Each module is designed to be assembled into an N-by-M grid to form a display system. To help modularize the sub-components, module frame 240 supports the fiber tapers and provides mounting onto a display base plate (not shown). The module frame features mounting bosses that are machined/lapped flat with respect to each other. These bosses present a stable mounting surface against the display base plate used to locate all modules to form a contiguous emissive display. The precise flat surface helps to minimize stresses produced when a module is bolted to a base plate. Cutouts along the end and side of module frame 240 not only provide for ventilation between modules but also reduce the stiffness of the frame in the planar direction ensuring lower stresses produced by thermal changes. A small gap between module frames also allows fiber taper bundles to determine the precise relative positions of each module. The optical stack and module frame can be cemented together using fixture or jig to keep the module's bottom surface (defined by the mounting bosses) planar to the face of the fiber taper bundles. Once their relative positions are established by the fixture, UV curable epoxy can be used to fix their assembly. Small pockets can also be milled into the subframe along the glue line and serve to anchor the cured epoxy.

Special consideration is given to stiffness of the mechanical support in general and its effect on stresses on the glass components due to thermal changes and thermal gradients. For example, the main plate can be manufactured from a low CTE (coefficient of thermal expansion) material. Also, lateral compliance is built into the module frame itself, reducing coupling stiffness of the modules to the main plate. This structure described above provides a flat and uniform active hogel display surface that is dimensionally stable and insensitive to moderate temperature changes while protecting the sensitive glass components inside.

As noted above, the generation of hogel data typically includes numerical corrections to account for misalignments and non-uniformities in the display. Generation algorithms utilize, for example, a correction table populated with correction factors that were deduced during an initial calibration process. Hogel data for each module is typically generated on digital graphics hardware dedicated to that one module, but can be divided among several instances of graphics hardware (to increase speed). Similarly, hogel data for multiple modules can be calculated on common graphics hardware, given adequate computing power. However calculated, hogel data is divided into some number of streams (in this case six) to span the six emissive devices within each module. This splitting is accomplished by the digital graphics hardware in real time. In the process, each data stream is converted to an analog signal (with video bandwidth), biased and amplified before being fed into the microdisplays. For other types of emissive displays (or other signal formats) the applied signal may be digitally encoded.

The basic design illustrated in FIG. 2 emphasizes scalability, utilizing a number of self-contained scalable modules. Again, there need not be a one-to-one correspondence between emissive displays and hogels displayed by a module. So, for example, module 110 can have a small exit array (e.g., 16×18) of active hogels and contains all of the components for pixel delivery and optical processing in a compact footprint allowing for seamless assembly with other modules. Conceptually, an active hogel display is designed to digitally construct an optical wavefront (in real-time or near-real-time) to produce a 3D image, mimicking the reconstructed wavefront recorded optically in traditional holography. Each emissive display is capable of controlling the amount of light emitted in a wide range of directions (depending in part on any fiber taper/bundle used, the lenslet array, masking, and any diffusion devices) as dictated by a set of hogel data. Together, the active hogel array acts as an optical wavefront decoder, converting wavefront samples (hogel data) from the virtual world into the real world. In many embodiments, the lenslets need only operate to channel light (akin to non-imaging optics) rather than focus light. Consequently, they can be made relatively inexpensively while still achieving acceptable performance.

Whatever technique is used to display hogel data, generation of hogel data should generally satisfy many rules of information theory, including, for example, the sampling theorem. The sampling theorem describes a process for sampling a signal (e.g., a 3D image) and later reconstructing a likeness of the signal with acceptable fidelity. Applied to active hogel displays, the process is as follows: (1) band-limit the (virtual) wavefront that represents the 3D image, e.g., limit variations in each dimension to some maximum; (2) generate the samples in each dimension with a spacing of greater than 2 samples per period of the maximum variation; and (3) construct the wavefront from the samples using a low-pass filter (or equivalent) that allows only the variations that are less than the limits set in step (1).

An optical wavefront exists in four dimensions: 2 spatial (e.g., x and y) and 2 directional (e.g., a 2D vector representing the direction of a particular point in the wavefront). This can be thought of as a surface—flat or otherwise—in which each infinitesimally small point (indexed by x and y) is described by the amount of light propagating from this point in a wide range of directions. The behavior of the light at a particular point is described by an intensity function of the directional vector, which is often referred to as the k-vector. This sample of the wavefront, containing directional information, is called a hogel, short for holographic element and in keeping with a hogel's ability to describe the behavior of an optical wavefront produced holographically or otherwise. A hogel is also understood as an element or component of a display, with that element or component used to emit, transmit, or reflect a desired sample of a wavefront. Therefore, the wavefront is described as an x-y array of hogels, e.g., $SUM[I_{xy}(k_x,k_y)]$, summed over the full range of propagation directions (k) and spatial extent (x and y).

The sampling theorem allows us to determine the minimum number of samples required to faithfully represent a 3D image of a particular depth and resolution. Further information regarding sampling and pixel dimensions may be found, for example, in the '005 application.

In considering various architectures for active hogel displays, the operations of generating hogel data, and converting it into a wavefront and subsequently a 3D image, uses three functional units: (1) a hogel data generator; (2) a light modulation/delivery system; and (3) light-channeling optics (e.g., lenslet array, diffusers, aperture masks, etc.). The purpose of the light modulation/delivery system is to generate a field of light that is modulated by hogel data, and to deliver this light to the light-channeling optics—generally a plane immediately below the lenslets. At this plane, each delivered pixel is a representation of one piece of hogel data. It should be spatially sharp, e.g., the delivered pixels are spaced by approximately 30 microns and as narrow as possible. A simple single active hogel can comprise a light modulator beneath a lenslet. The modulator, fed hogel data, performs as the light modulation/delivery system—either as an emitter of modulated light, or with the help of a light source. The lenslet—perhaps a compound lens—acts as the light-channeling optics. The active hogel display is then an array of such active hogels, arranged in a grid that is typically square or hexagonal, but may be rectangular or perhaps unevenly spaced. Note that the light modulator may be a virtual modulator, e.g., the projection of a real spatial light modulator (SLM) from, for example, a projector up to the underside of the lenslet array.

Purposeful introduction of blur via display module optics is also useful in providing a suitable dynamic autostereoscopic display. Given a hogel spacing, a number of directional samples (e.g., number of views), and a total range of angles (e.g., a 90-degree viewing zone), sampling theory can be used to determine how much blur is desirable. This information combined with other system parameters is useful in determining how much resolving power the lenslets should have. Further information regarding optical considerations such as spotsizes and the geometry of display modules may be found, for example, in the '005 application.

Figure 3:
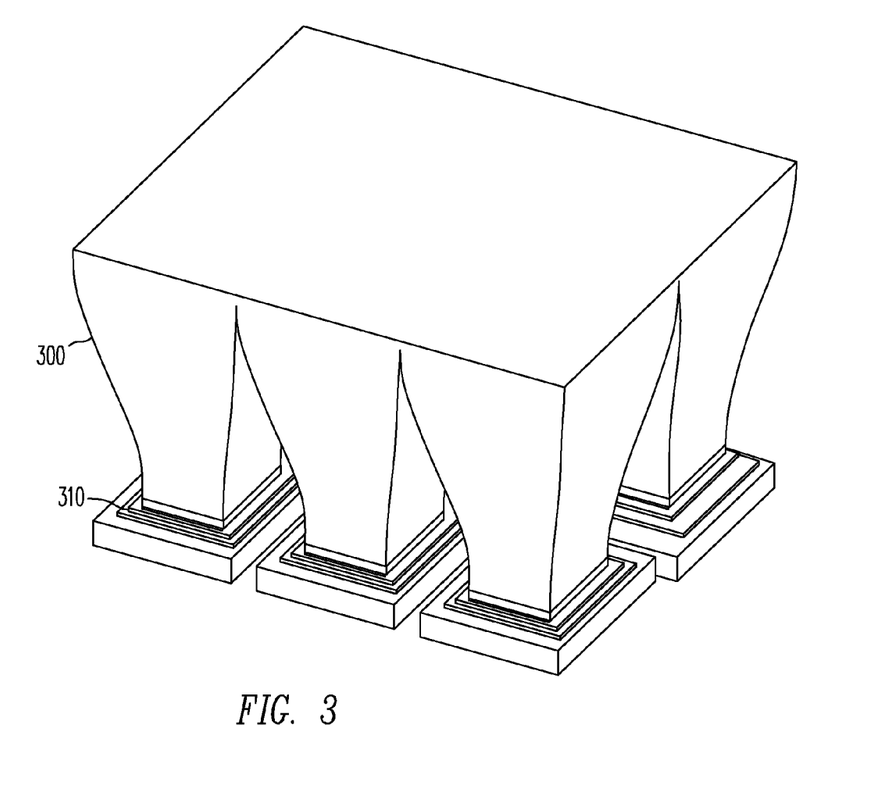
FIG. 3 illustrates an example of an optical fiber taper that can be used in dynamic autostereoscopic display modules.

FIG. 3 illustrates an example of an optical fiber taper that can be used in dynamic autostereoscopic display modules. Here, six separate fiber tapers 300 have their large faces fused together to form a single component with the optical and structural properties discussed above. Note that light modulation devices 310 are shown for reference. Coherent optical fiber bundles propagate a light field from an entrance plane to an exit plane while retaining spatial information. Although each of the fiber bundles 300 are tapered (allowing for magnification or demagnification), such bundles need not be tapered. Fiber bundles and tapered fiber bundles are produced by various companies including Schott North America, Inc. Each taper 300 is formed by first bundling a large number of multimode optical fibers in a hexagonal bundle fusing them together using heat, and then drawing one end to produce the desired taper. Taper bundles with desired shapes, e.g., rectangular-faced tapers, can be fabricated with a precision of less than 0.2 mm. Light emitted by an emissive display coupled to the small end of such a taper is magnified and relayed to the lenslet plane with less than 6 microns of blur or displacement. Tapers also provide precise control of the diffusion angle of light beneath the lenslets. In general, light at this plane must diverge by a large angle (60 degrees full-angle, or more) to achieve high active hogel fill factors. In some embodiments, optical diffusers are used to provide this function. However, light exiting many fiber tapers diverges by approximately 60 degrees (full angle) due to the underlying structure of the optical fibers. In still other embodiments, a fiber core diameter can be specified to produce an optimal divergence angle, yielding both a high fill factor and minimal crosstalk.

As noted above, optimal interfacing between emissive displays and fiber tapers may include replacing a standard glass cover that exists on the emissive display with a fiber optic faceplate, enabling the display to produce an image at the topmost surface of the microdisplay component. Fiber optic faceplates typically have no effect on color, and do not compromise the high-resolution and high-contrast of various emissive display devices. Fiber tapers can be fabricated in various sizes, shapes, and configurations: e.g., from round to round, from square to square, from round to square or rectangular; sizes range up to 100 mm in diameter or larger; typical magnification ratios range up to 3:1 or larger; and common fiber sizes range from 6 μm to 25 μm at the large end, and are typically in the 3 μm to 6 μm range on the small end.

In addition to the tapered fiber bundles of FIG. 3, arrays of non-tapered fiber bundles can also be used to deliver light in dynamic autostereoscopic display modules. Conventional fiber bundles attempt to maintain the image profile incident to the bundle. Instead, non-tapered fiber bundles can use a collection of fiber bundles or image conduits specially arranged and assembled so that an incident image is not perfectly maintained, but is instead manipulated in a predetermined way. Specifically, the light pattern or image can be divided into subsections which are spread apart upon exiting the device. Further information regarding fiber bundles may be found, for example, in the '005 application.

Figure 4:
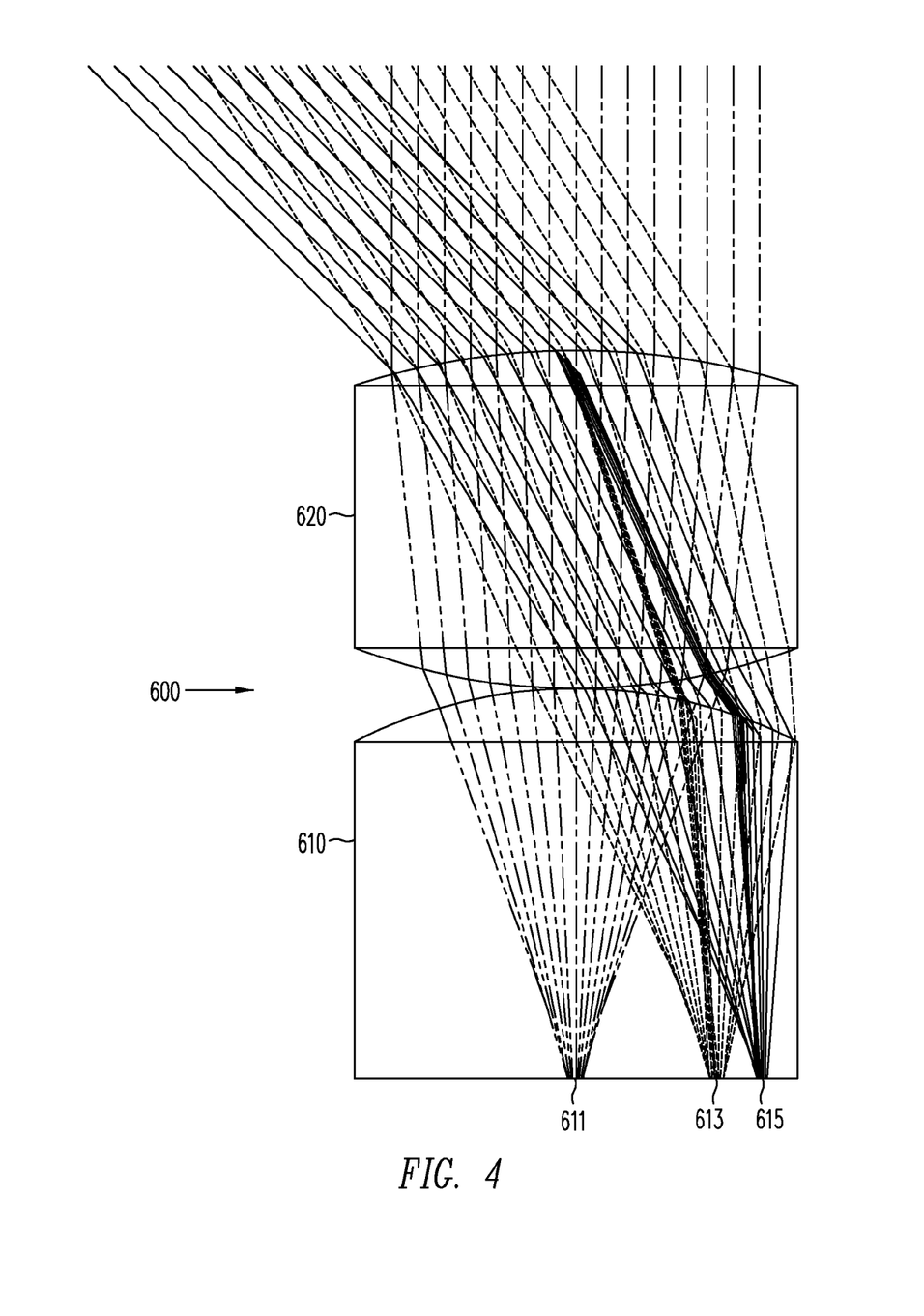
FIG. 4 illustrates an example of a multiple element lenslet system that can be used in dynamic autostereoscopic display modules.

Returning briefly to FIG. 2, lenslet array 220 provides a regular array of compound lenses. In one implementation, each of the two-element compound lens is a plano-convex spherical lens immediately below a biconvex spherical lens. FIG. 4 illustrates an example of a multiple element lenslet system 600 that can be used in dynamic autostereoscopic display modules. Light enters plano-convex lens 610 from below. A small point of light at the bottom plane (e.g., 611, 613, or 615, such light emitted by a single fiber in the fiber taper) emerges from bi-convex lens 620 fairly well collimated. Simulations and measurements show divergence of 100 milliradians or less can be achieved over a range of ±45 degrees. The ability to control the divergence of light emitted over a range of 90 degrees demonstrates the usefulness of this approach. Furthermore, note that the light emerges from lens 620 with a fairly high fill factor, e.g., it emerges from a large fraction of the area of the lens. This is made possible by the compound lens. In contrast, with a single element lens the exit aperture is difficult to fill.

Such lens arrays can be fabricated in a number of ways including: using two separate arrays joined together, fabricating a single device using a "honeycomb" or "chicken-wire" support structure for aligning the separate lenses, joining lenses with a suitable optical quality adhesive or plastic, etc. Manufacturing techniques such as extrusion, injection molding, compression molding, grinding, and the like are useful for these purposes. Various different materials can be used such as polycarbonate, styrene, polyamides, polysulfones, optical glasses, and the like.

The lenses forming the lenslet array can be fabricated using vitreous materials such as glass or fused silica. In such embodiments, individual lenses may be separately fabricated, and then subsequently oriented in or on a suitable structure (e.g., a jig, mesh, or other layout structure) before final assembly of the array. In other embodiments, the lenslet array will be fabricated using polymeric materials and using well known processes including fabrication of a master and subsequent replication using the master to form end-product lenslet arrays. In general, the particular manufacturing process chosen can depend on the scale of the lenses, complexity of the design, and the desired precision. Since each lenslet described in the present application can include multiple lens elements, multiple arrays can be manufactured and subsequently joined. In still other examples, one process may be used for mastering one lens or optical surface, while another process is used to fabricate another lens or optical surface of the lenslet. For example, molds for microoptics can be mastered by mechanical means, e.g., a metal die is fashioned with the appropriate surface(s) using a suitable cutting tool such as a diamond cutting tool. Similarly, rotationally-symmetrical lenses can be milled or ground in a metal die, and can be replicated so as to tile in an edge-to-edge manner. Single-point diamond turning can be used to master diverse optics, including hybrid refractive/diffractive lenses, on a wide range of scales. Metallic masters can also be used to fabricate other dies (e.g., electroforming a nickel die on a copper master) which in turn are used for lenslet array molding, extrusion, or stamping. Still other processes can be employed for the simultaneous development of a multiple optical surfaces on a single substrate. Examples of such processes include: fluid self-assembly, droplet deposition, selective laser curing in photopolymer, photoresist reflow, direct writing in photoresist, grayscale photolithography, and modified milling. More detailed examples of lenslet array fabrication are described in U.S. Pat. No. 6,721,101, entitled "Lens arrays" and naming Stephen Daniell as inventor, which is hereby incorporated by reference herein in its entirety.

Figure 5:
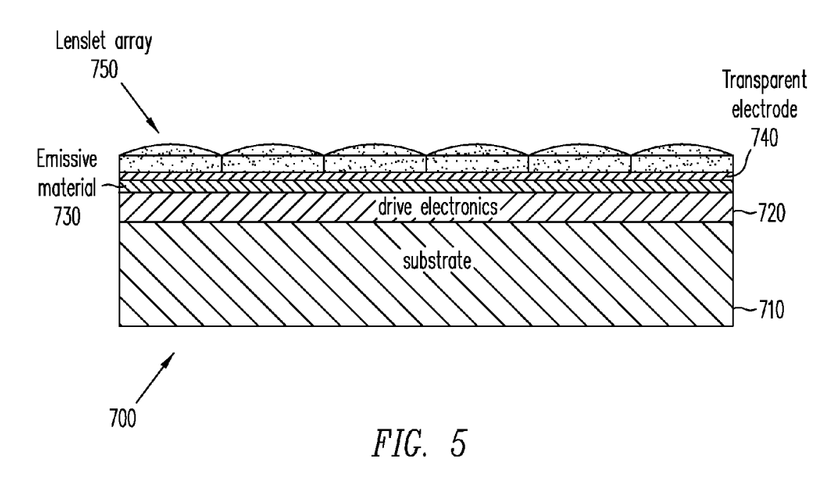
FIG. 5 illustrates an example of a dynamic autostereoscopic display module where optical fiber tapers or bundles are not used.

As noted above, fiber tapers and fiber bundle arrays can be useful in transmitting light from emissive displays to the lenslet array, particularly where emissive displays cannot be so closely packed as to be seamless or nearly seamless. However, FIG. 5 illustrates an example of a dynamic autostereoscopic display module where optical fiber tapers or bundles are not used. Display module 700 forgoes the use of fiber tapers/bundles by attaching lenslet array 750 very close to the emissive device. Display module 700 includes a substrate 710 providing adequate mechanical stability for the module. Substrate 710 can be fabricated out of a variety of materials including, for example, metal, plastics, and printed circuit board materials. Drive electronics 720 are mounted on substrate 710 and below emissive material 730. This configuration is usable, for example, with emissive display devices such as OLED microdisplays. Module 700 can be fabricated to include a single emissive device (e.g., the emissive layer is addressed/driven as a single micro display), or with multiple emissive devices on the same substrate. As the example of FIG. 5 illustrates an OLED device, module 700 includes a transparent electrode 740, common to these and other emissive display devices. Finally, lenslet array 750 is attached on top of transparent electrode 740.

As will be understood by those having ordinary skill in the art, many variations of the basic design of module 700 can be implemented. For example, in some embodiments, lenslet array 750 is fabricated separately and subsequently joined to the rest of module 700 using a suitable adhesive and/or index matching material. In other embodiments, lenslet array 750 is fabricated directly on top of the emissive display using one or more of the aforementioned lenslet fabrication techniques. Similarly, various different types of emissive displays can be used in this module. In still other embodiments, fiber optic faceplates (typically having thicknesses of less than 1 mm) can be used between lenslet array 750 and the emissive display.

Various computer systems may be used for one or more of the techniques described herein. For example, a computer system with one or more processors, including a multi-core processor, may be used in various implementations of the devices and techniques discussed above. A computer system may include a memory coupled to the processor by a communications bus. The memory may be a random access memory (RAM) or some other dynamic storage device and may be capable of storing instructions to be executed by the processor, e.g., an operating system and applications, as well as database information. The operating system may include software for implementing a file system, managing communications, managing peripheral hardware and optoelectronic equipment, or combinations thereof, among others. The applications may include control applications, data gathering and applications, computational applications, communications software, timing software, interfaces to storage systems, or user interfaces, or combinations thereof, among others. The memory may also include computer readable storage media, such as electronic memory (e.g., a Single Inline Memory Module (SIMM) card or a flash memory), and/or magnetic storage (e.g., a hard disk), and/or optical storage (e.g. a CD ROM).

A computer system may also include input devices such as a keyboard and mouse, communications interfaces such as a SCSI interface, and/or one or more network interfaces supporting wired and/or wireless communications, and output devices such as interfaces to display systems. It will be apparent to those having ordinary skill in the art that the computer system may also include numerous additional elements, such as additional storage devices, communications devices, and input devices and output devices, among others.

The above discussions and accompanying figures illustrate some of the many operational examples of the techniques of the present invention. Those having ordinary skill in the art will readily recognize that certain steps or operations described herein may be eliminated or taken in an alternate order. Moreover, various operations may be implemented as one or more software programs for a computer system, using a variety of computer languages, including, for example, traditional computer languages such as assembly language, Pascal, and C; object oriented languages such as C++, C#, and Java; or scripting languages such as Perl and Tcl/Tk; or combinations thereof. The software may be encoded in a computer readable storage medium as instructions executable on one or more processors, including a multi-core processor. The computer readable storage medium may include a solid-state storage medium, a magnetic storage medium, or an optical storage medium, or combinations thereof. The software programs may also be carried in a communications medium conveying signals encoding the instructions. Separate instances of these programs may be executed on separate computer systems. Thus, although certain steps have been described as being performed by certain devices, software programs, processes, or entities, this need not be the case and a variety of alternative implementations will be understood by those having ordinary skill in the art.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A system comprising:
a multi-core processor configured to communicate with an optical display and to control a plurality of hogels in the optical display, the multi-core processor comprising:
at least two cores in a single integrated circuit package,
a master processor coupled to each of the cores, and
an on-chip memory coupled to each of the cores;
wherein:
each hogel among the plurality of hogels comprises
a corresponding lenslet among an array of lenslets, and
a corresponding plurality of controllable light sources configured to emit light into the corresponding lenslet; and
each hogel is configured to radiate light in a plurality of directions, with controllable intensities in each of the plurality of directions, and each of the cores is configured to receive hogel data and to generate signals for a corresponding subset of the hogels.

2. The system of claim 1, wherein more than one of the cores correspond to each of the hogels.

3. The system of claim 1, wherein each of the cores corresponds to more than one of the hogels.

4. The system of claim 1, wherein:
at least two of the cores share one or more of: on-chip cache circuitry, on-chip bus interface circuitry, or on-chip memory controller circuitry;
the optical display comprises one of: an emissive display, a transmissive display, or a reflective display; and
a subset of the cores is configured to composite multiple hogel data streams and a different subset of the cores is configured to synchronize multiple hogel data streams.

5. The system of claim 1, further comprising:
the optical display.

6. The system of claim 1, wherein at least one subset of the cores is configured to perform rendering calculations for a corresponding portion of the hogel data.

7. The system of claim 1, wherein:
at least two of the cores correspond to a single one of the subsets of the hogels; and
among the at least two cores,
one of the cores is configured for hogel rendering calculations, and
another of the cores is configured for support calculations.

8. The system of claim 1, wherein for each hogel, the plurality of controllable light sources comprises one or more of: an OLED microdisplay, or a plurality of fiber tips.

9. The system of claim 1, wherein, for each hogel:
the corresponding lenslet comprises a plano-convex lens; and
the plurality of controllable light sources comprises a plurality of small sources at a planar surface of the plano-convex lens.

10. A system comprising:
at least one multi-core processor, configured to communicate with an optical display comprising a plurality of hogels, and to control the operation of the hogels, wherein
each hogel is configured to radiate light in plurality of directions, with controllable intensities in each of the plurality of directions, and
the multi-core processor comprises
an on-chip memory,
a master processor,
a first set of cores coupled to the master processor and to the memory, and configured to receive hogel data from the memory for a first model and to generate corresponding signals for the first model, wherein the first model comprises a three-dimensional model, and
a second set of cores coupled to the master processor and to the memory, and configured to receive hogel data from the memory for a second model and to generate corresponding signals for the second model; and
an overlay module within the multi-core processor, coupled to at least one core in the first set of cores and to at least one core in the second set of cores, and configured to:
combine signals for the first and second models into at least one combined output signal, and transmit the combined output signal to one or more corresponding hogels in the optical display.

11. The system of claim 10, wherein:
the second model comprises annotation information correlated with the first model; and
the overlay module is comprised in one of the cores.

12. A method comprising:
receiving, at a first core within a multi-core processor, hogel data for a first set of hogels in a dynamic optical display, wherein
each hogel among the first set of hogels comprises
a corresponding lenslet among an array of lenslets, and
a corresponding plurality of controllable light sources configured to emit light into the corresponding lenslet, and
each hogel is configured to radiate light in a plurality of directions, with controllable intensities in each of the plurality of directions;
receiving, at a second core within the multi-core processor, hogel data for a second set of hogels in the optical display;
performing calculations within the first core for the first set of hogels; and
performing calculations within the second core for the second set of hogels;
wherein the first and second cores are responsive to commands from an on-chip master processor.

13. The method of claim 12, wherein the first set of hogels consists of one hogel, the method further comprising:
receiving, at a third core within the multi-core processor, hogel data for the one hogel.

14. The method of claim 12, wherein the first set of hogels consists of two or more hogels, and the second set of hogels consists of two or more hogels that are different from the hogels in the first set of hogels.

15. The method of claim 12, wherein the first and second cores share one or more of: on-chip cache circuitry, on-chip bus interface circuitry, or on-chip memory controller circuitry.

16. The method of claim 12, wherein the calculations within the first core comprise rendering calculations for the first set of hogels, the method further comprising:
receiving, at a third core within the multi-core processor, hogel data for the first set of hogels in the optical display; and
performing support calculations within the third core for the first set of hogels.

17. A system comprising:
means for providing, to a first core within a multi-core processor, hogel data for a first set of hogels in a dynamic optical display, wherein
each hogel among the first set of hogels comprises
a corresponding lenslet among an array of lenslets, and
a corresponding plurality of controllable light sources configured to emit light into the corresponding lenslet, and
each hogel is configured to radiate light in a plurality of directions, with controllable intensities in each of the plurality of directions;
means for providing, to a second core within the multi-core processor, hogel data for a second set of hogels in the dynamic optical display;
means for performing calculations within the first core for the first set of hogels; and
means for performing calculations within the second core for the second set of hogels;
wherein the first and second cores are responsive to commands from an on-chip master processor.

18. The system of claim 17, wherein the first set of hogels consists of one hogel, the system further comprising:
means for providing, to a third core within the multi-core processor, hogel data for the one hogel.

19. The system of claim 17, wherein the first set of hogels consists of two or more hogels, and the second set of hogels consists of two or more hogels that are different from the hogels in the first set of hogels.

20. The system of claim 17, wherein the first and second cores share one or more of: on-chip cache circuitry, on-chip bus interface circuitry, or on-chip memory controller circuitry.

21. The system of claim 17, wherein the calculations within the first core comprise rendering calculations for the first set of hogels, the system further comprising:
means for providing, to a third core within the multi-core processor, hogel data for the first set of hogels in the optical display; and
means for performing support calculations within the third core for the first set of hogels.

22. A non-transitory computer-readable medium comprising:
a computer-readable storage medium; and
computer-executable instructions, encoded on the computer-readable storage medium and configured to cause one or more cores to execute acts of:
receiving, at a first core within a multi-core processor, hogel data for a first set of hogels in a dynamic optical display, wherein
each hogel among the first set of hogels comprises
a corresponding lenslet among an array of lenslets, and
a corresponding plurality of controllable light sources configured to emit light into the corresponding lenslet, and
each hogel is configured to radiate light in a plurality of directions, with controllable intensities in each of the plurality of directions;
receiving, at a second core within the multi-core processor, hogel data for a second set of hogels in the optical display;
performing calculations within the first core for the first set of hogels; and
performing calculations within the second core for the second set of hogels;
wherein the first and second cores are responsive to commands from an on-chip master processor.

* * * * *